US008725361B2

(12) United States Patent
Kellum

(10) Patent No.: US 8,725,361 B2
(45) Date of Patent: May 13, 2014

(54) VEHICLE GUIDANCE SYSTEM AND METHOD

(75) Inventor: Carroll C. Kellum, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 92 days.

(21) Appl. No.: 13/459,577

(22) Filed: Apr. 30, 2012

(65) Prior Publication Data

US 2013/0289817 A1 Oct. 31, 2013

(51) Int. Cl.
*G06G 7/78* (2006.01)

(52) U.S. Cl.
USPC .............. 701/50; 701/24; 701/26; 701/532; 56/10.2 F; 56/15.4; 56/15.5

(58) Field of Classification Search
CPC ...... E02F 9/2045; E02F 9/264; A01B 69/004; A01B 69/008
USPC .............. 701/23–26, 50, 408, 409, 445, 532, 701/533; 56/10.1, 10.2 R, 10.2 F, 15.4, 15.5
See application file for complete search history.

(56) References Cited

U.S. PATENT DOCUMENTS

| 3,991,618 A | | 11/1976 | Stampfer et al. |
| 4,304,316 A | | 12/1981 | Lang |
| 4,505,094 A | | 3/1985 | Demorest |
| 4,967,362 A | * | 10/1990 | Schutten et al. ................. 701/50 |
| 4,976,094 A | * | 12/1990 | Williamson et al. ............ 56/330 |
| 5,019,983 A | | 5/1991 | Schutten et al. |
| 5,079,706 A | * | 1/1992 | Yamaguchi et al. ............ 701/23 |
| 6,671,582 B1 | * | 12/2003 | Hanley ........................... 700/245 |
| 7,010,425 B2 | * | 3/2006 | Gray et al. ...................... 701/425 |
| 7,543,436 B2 | * | 6/2009 | Scott et al. ..................... 56/328.1 |
| 7,669,398 B1 | * | 3/2010 | King et al. ..................... 56/328.1 |
| 7,854,108 B2 | * | 12/2010 | Koselka et al. ............. 56/10.2 A |
| 8,010,261 B2 | * | 8/2011 | Brubaker ......................... 701/50 |
| 2010/0303596 A1 | * | 12/2010 | Dagorret ........................ 414/495 |
| 2011/0118926 A1 | | 5/2011 | Peake et al. |

FOREIGN PATENT DOCUMENTS

EP 0375301 A1 6/1990

OTHER PUBLICATIONS

Zhang et al, Method for an Electric Controlled Platooning System of Agricultural Vehicles, 2009 IEEE International Conference on Digital Object Identifier, 2009, pp. 156-161.*
European Search Report, dated Aug. 23, 2013 (9 pages).

* cited by examiner

*Primary Examiner* — Russell Frejd

(57) ABSTRACT

A guidance method and system automatically steers a guided vehicle which moves along a planned path between adjacent crop rows. The vehicle has a frame and steerable wheels. The method includes generating a left crop position signal with a left crop sensor on a left side of the vehicle, generating a right crop position signal with a right crop sensor on a right side of the vehicle, and generating a vehicle position signal with a vehicle position sensor unit. The method also includes generating a difference position signal by subtracting one of the left and right crop position signals from the other of the left and right crop position signals, and converting the difference position signal into a time-varying lateral offset signal. The method also includes offsetting the planned path by the time-varying lateral offset signal, and guiding the vehicle as a function of the offset planned path.

16 Claims, 2 Drawing Sheets

VEHICLE GUIDANCE SYSTEM AND METHOD

FIELD OF THE INVENTION

The present disclosure relates to a method and system for guiding a vehicle.

BACKGROUND OF THE INVENTION

Orchards are generally surveyed and maintained in rows, but various factors may introduce slight offsets within a row. For example, if one side of a row has more sunlight than the other, the tree may grow towards the sun. Additionally, human operators are used to hedge the trees and may hedge one side of a row more than the other introducing an offset. The offset results in a new centerline for the row. The end result is that even a well surveyed orchard has variation in row centers.

In a traditional orchard vehicle operation, a human operator in the cab reacts to visual and auditory cues to sense a middle area between trees in a row and steers the vehicle towards that middle area. The goal is to avoid contact with the trees which may damage the vehicle or trees.

An unmanned autonomous vehicle within an orchard row can be guided by GPS and a map. If the map is out of date compared to the centerlines of the row, which may have been redefined after the last hedging, the vehicle may drive with an offset relative to the center. The offset may cause the vehicle to heavily contact the trees and damage either the trees and/or the vehicle.

Cameras, radars, lasers, and ultrasonic sensors have been used in guidance systems to detect the distance to the crop or trees and in order to attempt to center the vehicle based on the distance measurements. Such systems are expensive and prone to damage due to optics, radomes, or openings. Additionally, they have difficulty detecting heavy contact with the tree if the tree is close to the sensor itself.

SUMMARY

According to an aspect of the present disclosure, a system is provided which can mechanically sense the edge of crop rows and infer a center between the rows. On both sides of the vehicle, a moveable arm is placed near the outermost side portion of the vehicle. The arm is spring loaded so that it is always pushed outwardly. A sensor senses the position of the arm. As the crop push into the arm, it is forced back towards the vehicle and the system detects that the arm is making contact with the crop. Based on the position and the spring characteristics, the force from the crop or crop position is determined. As the vehicle's position relative to the crop changes over time, the edge of the crop row or tree line can be determined.

A control system steers the vehicle is controlled, as a function of the sensed crop position, to keep the vehicle in an optimal position relative to the row center between the edges of the crop rows. If the vehicle is equipped with sensor on either side and one sensor indicates heavy push against the crop, while the other sensor detects no push, the steering system will steer away from the heavily pushed side and towards the non-pushed side, in the case where the vehicle should drive down the center between the crop rows. In the case where both sensors are being pushed, the steering system can be controlled to equalize the pressure or position on both sides.

The information or data generated and determined can be stored. This data can be transmitted to a remote unit, which can combine it with current map data in order to update the map itself, so that the row center can be more accurately followed during the next task.

BRIEF DESCRIPTION OF THE DRAWINGS

FIG. 4 is a simplified schematic view of the crop sensor of FIG. 1.

DETAILED DESCRIPTION OF THE DRAWINGS

Figure 1:
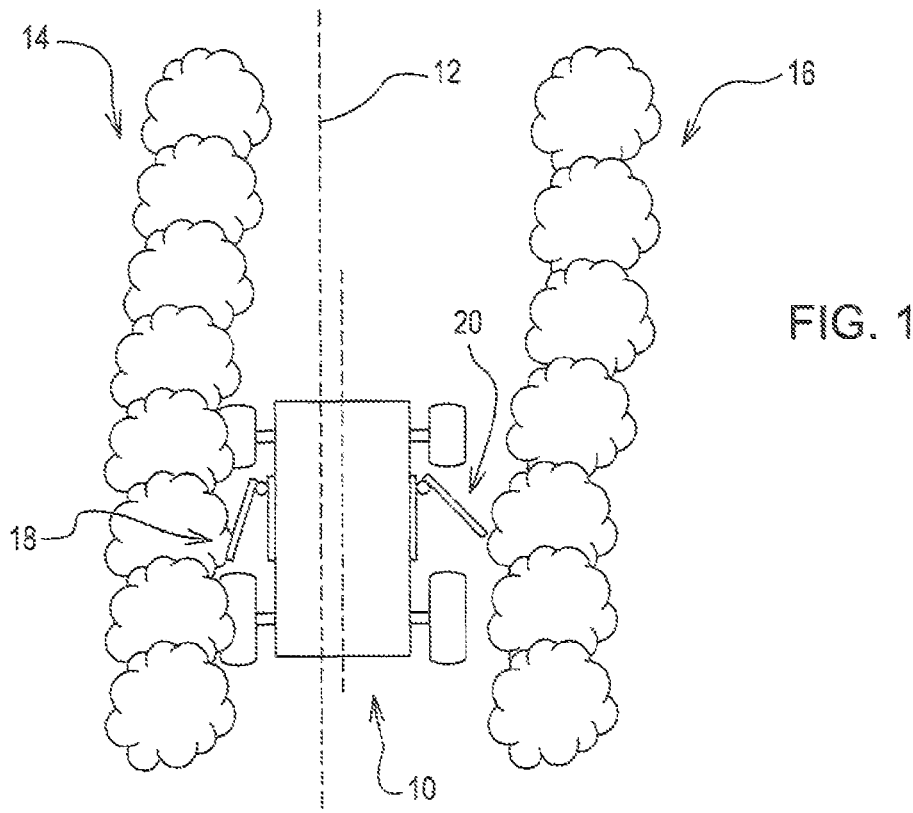
FIG. 1 is a simplified schematic view of a guided vehicle embodying the invention.

Referring to FIG. 1, a guided vehicle 10 is movable along a planned path 12 on the ground between adjacent rows 14, 16 of crop. The vehicle 10 includes a left crop sensor 18 and a right crop sensor 20. The left crop sensor 18 is mounted on the left side of the vehicle 10 and generates a left crop position signal. The right crop sensor 20 is mounted on the right side of the vehicle 10 and generates a right crop position signal.

Figure 2:
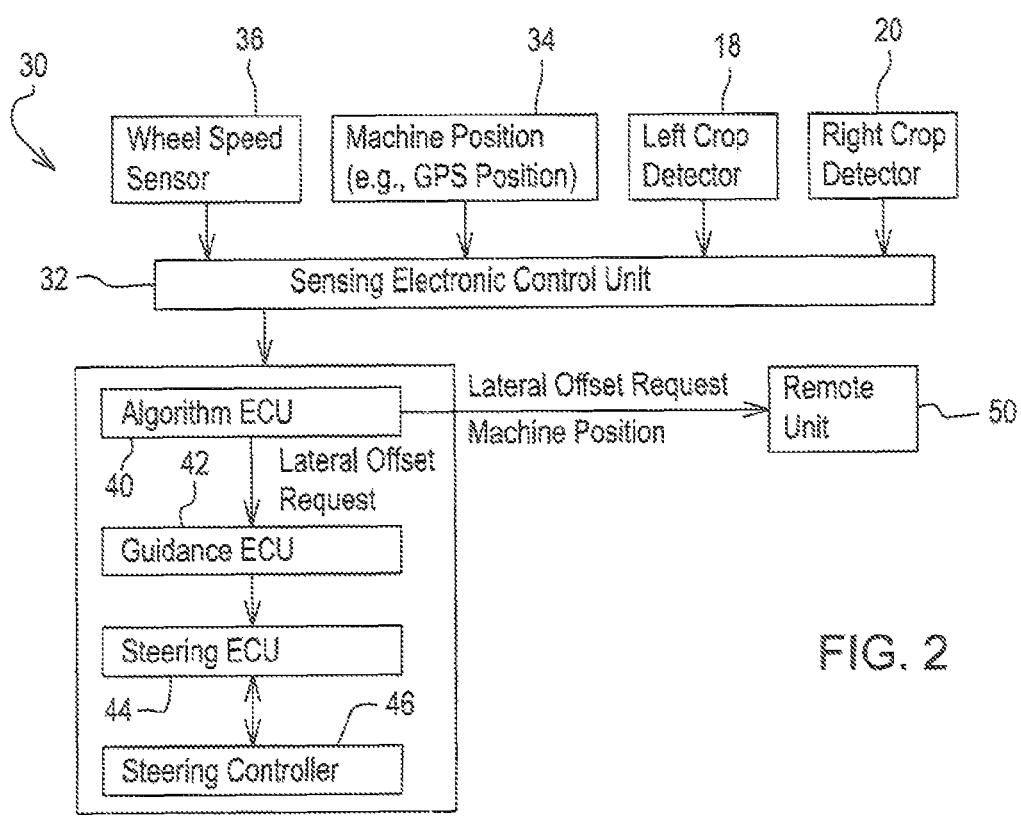
FIG. 2 is simplified schematic diagram of a crop position guidance control system.

Referring to FIG. 2, the vehicle 10 includes a control system 30. Control system 30 includes a sensing electronic control unit (ECU) 32 which is connected to the left and right crop sensor 18, 20, to a vehicle position unit 34, such as a conventional GPS unit, and to a vehicle or wheel speed sensor 36. Vehicle position unit 34 generates a vehicle position signal. Vehicle speed sensor 36 generates a vehicle speed signal. Control system may also include an algorithm ECU 40, a guidance ECU 42 and a steering. ECU 44, preferably connected together by a conventional bus, such as a CAN bus. One or more of these various ECUs may be combined into fewer or into a single ECU (not shown).

The sensing ECU 32 communicates the sensor signals to the algorithm ECU 40. The output of algorithm ECU 40 is communicated to the guidance ECU 42. The output of guidance ECU 42 is communicated to the steering ECU 44. The output of the steering ECU 44 is, communicated to a known steering controller 46. Steering controller 46 preferably includes steering valves (not shown) and sensors (not shown), such as are part of an active command steering system or AutoTrac steering system, which are available on production John Deere tractors. The output of algorithm ECU 40 is also preferably transmitted wirelessly to a remote unit 50 for monitoring, analysis and/or storage. For example, the information can be combine with map data for future vehicle use.

The control system 30 generates a left crop position signal with the left crop sensor 18, and generates a right position signal with the right crop sensor 20. A vehicle position signal is generated by the vehicle position sensor unit 34. A vehicle speed signal is generated by the wheel speed sensor 36.

Figure 3:
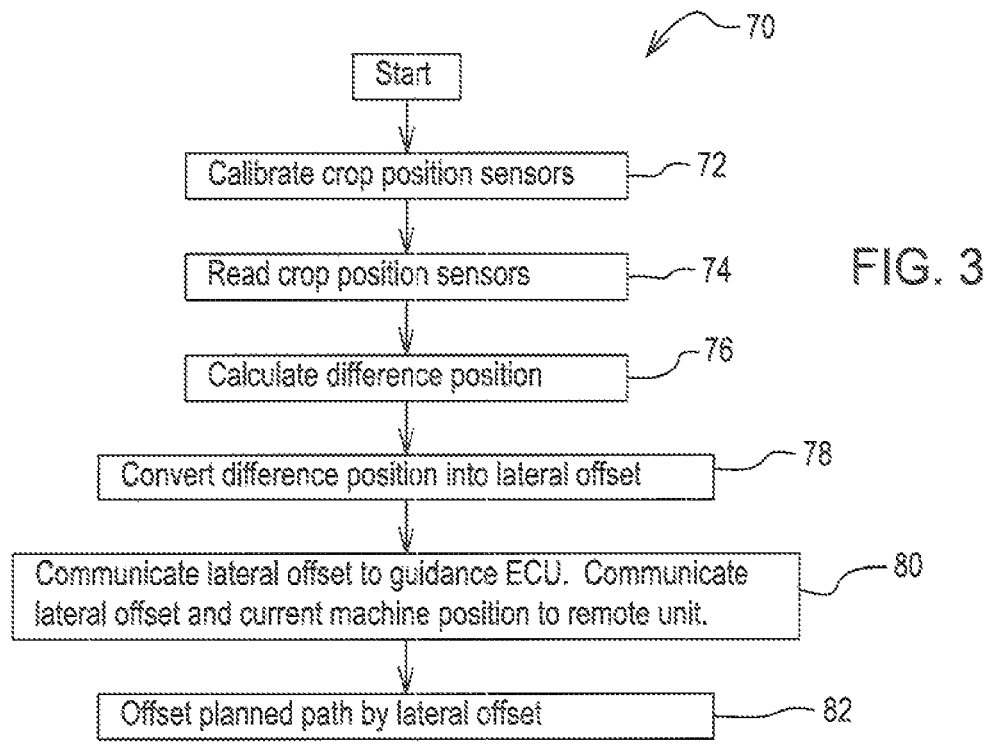
FIG. 3 is

The ECU 40 is programmed so that the control system 30 performs the algorithm 70 or method steps shown in FIG. 3. At step 72, the control system 30 can perform a calibration of the crop position sensors 18 and 20. Such a calibration could be similar to the way production vehicle clutch pedals and throttle potentiometers are calibrated.

In step 74, the algorithm reads the crop position signals 18 and 20.

In step 76, the algorithm generates a difference position signal by subtracting one of the left and right crop position signals from the other of the left and right crop position signals.

Next, in step 78, the difference position signal is converted into a time-varying lateral offset signal. This is preferably accomplished by using a stored look-up table of conversion values that is determined for a particular vehicle.

Next, in step 80, the time-varying lateral offset signal is communicated to the guidance ECU 42. Also, the time-varying lateral offset signal may be communicated, such as wirelessly, to the remote unit 50.

In step 82, the guidance ECU offsets the planned path by the time-varying lateral offset signal. Then the guidance ECU 42 guides the vehicle 10 as a function along the offset planned path. The control system 30 also guides the vehicle as a function of the offset planned path and the vehicle speed signal.

The conversion of the above flow chart into a standard language for implementing the algorithm described by the flow chart in a digital computer or microprocessor will be evident to one with ordinary skill in the art.

Figure 4:
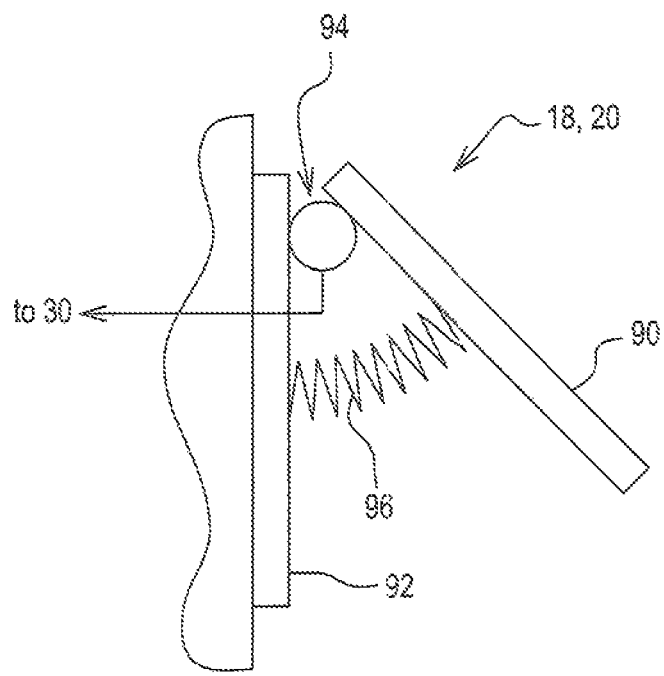
FIG. 4 is a flow chart of an algorithm performed by the control system of FIG. 2.

Referring to FIG. 4, each crop position sensor preferably includes a crop engaging arm 90 which is pivotally coupled to a fixed plate 92 which is mounted to the side of the vehicle 10. A rotary potentiometer 94 provides the crop position signal to the control system 30 based on the rotary position of the arm 90. A spring 96 is biased to urge the arm 90 outwardly away from plate 92.

The result is a sensing system which detects the presence/location of crop edges, such as tree edges within an orchard, and uses that information to control the path of a vehicle and/or store the information in a map for future vehicle use.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A method of automatically steering a guided vehicle which is movable along a predetermined planned path between adjacent crop rows, the vehicle having a frame and steerable wheels, said method comprising:
    generating a left crop position signal with a left crop sensor on a left side of the vehicle;
    generating a right crop position signal with a right crop sensor on a right side of the vehicle;
    generating a vehicle position signal with a vehicle position sensor unit;
    generating a difference position signal by subtracting one of the left and right crop position signals from the other of the left and right crop position signals;
    converting the difference position signal into a time-varying lateral offset signal; and
    offsetting the planned path by the time-varying lateral offset signal; and
    guiding the vehicle as a function of the offset planned path.

2. The method of claim 1, further comprising:
    generating a vehicle speed signal with a vehicle speed sensor; and
    guiding the vehicle as a function of the adjusted planned path and the vehicle speed signal.

3. The method of claim 1, further comprising:
    transmitting the offset signal and the current vehicle position signal to a remote unit.

4. The method of claim 1, further comprising:
    updating map data based on the time-varying lateral offset signal.

5. A steering control system for a guided vehicle which is movable along a predetermined planned path between adjacent crop rows, the vehicle having a frame and steerable wheels, said control system comprising:
    a vehicle position sensor unit;
    a left crop sensor on a left side of the vehicle, the left crop sensor generating a left crop position signal;
    a right crop sensor on a right side of the vehicle, the right crop sensor generating a right crop position signal; and
    a control unit which receives the left and right crop position signals, the control unit generating a vehicle position signal in response to the vehicle position sensor unit, the control unit generating a difference position signal by subtracting one of the left and right crop position signals from the other of the left and right crop position signals, the control unit converting the difference position signal into a time-varying lateral offset signal, the control unit offsetting the planned path by the time-varying lateral offset signal, and the control unit guiding the vehicle as a function of the offset planned path.

6. The steering control system of claim 5, further comprising:
    a vehicle speed sensor for generating a vehicle speed signal with; and
    the control unit guiding the vehicle as a function of the adjusted planned path and the vehicle speed signal.

7. The steering control system of claim 5, further comprising:
    a remote unit, and the control unit transmitting the offset signal and the current vehicle position signal to the remote unit.

8. The steering control system of claim 5, wherein:
    the control unit updates map data based on the time-varying lateral offset signal.

9. A method of automatically steering a guided vehicle which is movable along a predetermined planned path between adjacent crop rows, the vehicle steerable wheels, said method comprising:
    generating a left crop position signal with a left crop sensor on a left side of the vehicle;
    generating a right crop position signal with a right crop sensor on a right side of the vehicle;
    converting the left and right crop position signals into a time-varying lateral offset signal;
    offsetting the planned path by the time-varying lateral offset signal; and
    guiding the vehicle as a function of the offset planned path.

10. The method of claim 9, further comprising:
    generating a vehicle speed signal with a vehicle speed sensor; and
    guiding the vehicle as a function of the offset planned path and the vehicle speed signal.

11. The method of claim 9, further comprising:
    transmitting the offset signal and the current vehicle position signal to a remote unit.

12. The method of claim 9, further comprising:
    updating map data based on the time-varying lateral offset signal.

13. A method of automatically steering a guided vehicle which is movable along a predetermined planned path adjacent to a crop, the vehicle having steerable wheels, said method comprising:
- generating a crop position signal on a side of the vehicle;
- converting the crop position signal into a time-varying lateral offset signal;
- offsetting the planned path by the time-varying lateral offset signal; and
- guiding the vehicle as a function of the offset planned path.

14. The method of claim 13, further comprising:
- generating a vehicle speed signal with a vehicle speed sensor; and
- guiding the vehicle as a function of the offset planned path and the vehicle speed signal.

15. The method of claim 13, further comprising:
- transmitting the offset signal and the current vehicle position signal to a remote unit.

16. The method of claim 13, further comprising:
- updating map data based on the time-varying lateral offset signal.

\* \* \* \* \*